UNITED STATES PATENT OFFICE.

JAMES ROBINSON HATMAKER, OF PARIS, FRANCE.

MODIFIED DRY MILK.

No. 891,336.  Specification of Letters Patent.  Patented June 23, 1908.

Application filed September 15, 1905. Serial No. 278,592.

*To all whom it may concern:*

Be it known that I, JAMES ROBINSON HATMAKER, a citizen of the United States, residing at Paris, France, have invented new and useful Improvements in Modified Dry Milk, of which the following is a specification.

My invention is a new dry, homogeneous food composed entirely of milk constituents and prepared so as to be free from germs and easily assimilable by infants and others, and having approximately the following composition:

| | |
|---|---|
| Casein | 24% |
| Butter fat | 12 |
| Milk sugar | 54 |
| Milk salts | 5 |
| Moisture | 5 |
| | 100% |

It having been proved that drying cow's milk rapidly by exposing it in a very thin film or layer, for a limited time, to the evaporation influence of a temperature in excess of 212° F. not only completely sterilizes it but renders its casein ingredient easily assimilable, I prepare the liquid from which my new food is obtained and dry it rapidly, in a very thin uniform film upon a suitable surface heated in excess of 212° F. until only sufficient water for its good preservation remains—substantially as described in the specification of Letters Patent No. 712,545 (dated November 4, 1902).

The dry product obtained is homogeneous in character, light in color and in form, flaky and easily reduced to powder, and perfectly sterile.

The particular composition of my food is most important for it is extremely rich in easily assimilable casein, fairly rich in milk-sugar and relatively low in fat.

I have found that a much higher percentage of casein than is commonly recommended is highly desirable in infant feeding and that casein in the easily assimilable form in which I employ it is highly suitable for the purpose and that it is advantageously employed, in many cases, with a low percentage of fat.

I prepare the liquid from which my dry food is obtained by removing a portion of the cream from fresh milk (leaving therein only sufficient cream to give approximately the percentage of fat specified, in the dry product) and then adding to it—preferably in solution—a sufficient quantity of milk-sugar to give the dry product to be obtained approximately the percentage of milk-sugar specified. Salts natural to milk may also be added if necessary or desirable. This preparation is then dried rapidly, as indicated above.

Making a solution of milk and milk-sugar and then drying such solution gives a homogeneous product that is very different in character from mechanical mixtures of dry milk and milk-sugar. Furthermore drying the milk-sugar in solution with the milk, as above indicated, gives a completely sterile product,—the added milk-sugar being sterilized as well as the milk.

What I claim as my invention and desire to secure by Letters Patent is:

The hereinbefore described homogeneously-combined sterile food in light dry form, for infants and others, composed of milk constituents in approximately the following proportions: casein, 24%; butter fat, 12%; milk sugar, 54%; milk salts, 5%; moisture, 5%.

In testimony whereof I have signed my name to this specification in the presence of two subscribing witnesses.

JAMES ROBINSON HATMAKER.

Witnesses:
 WILLIAM S. MAGILL,
 RUDOLPH LEIPOLD.